United States Patent Office 2,703,148
Patented Mar. 1, 1955

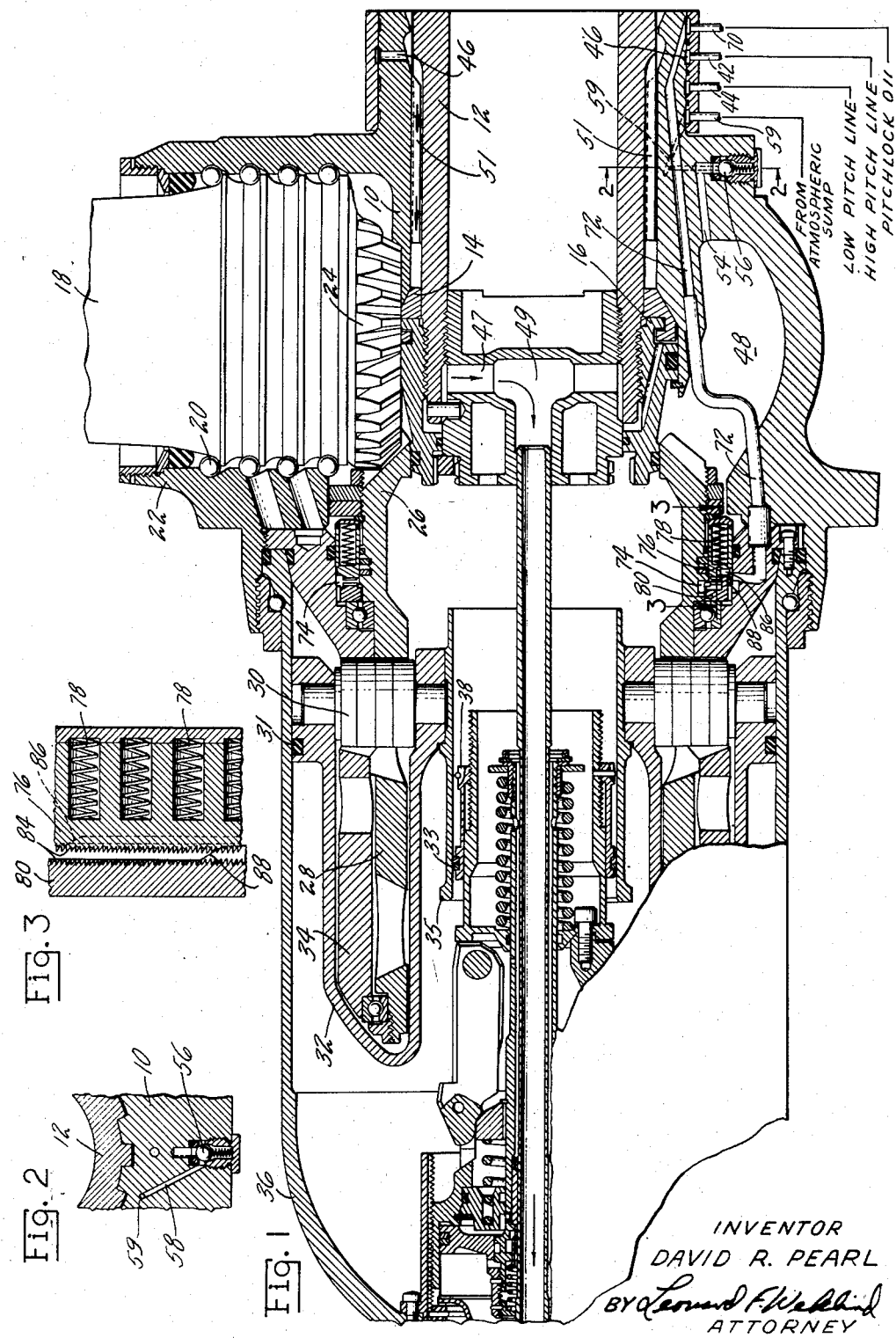

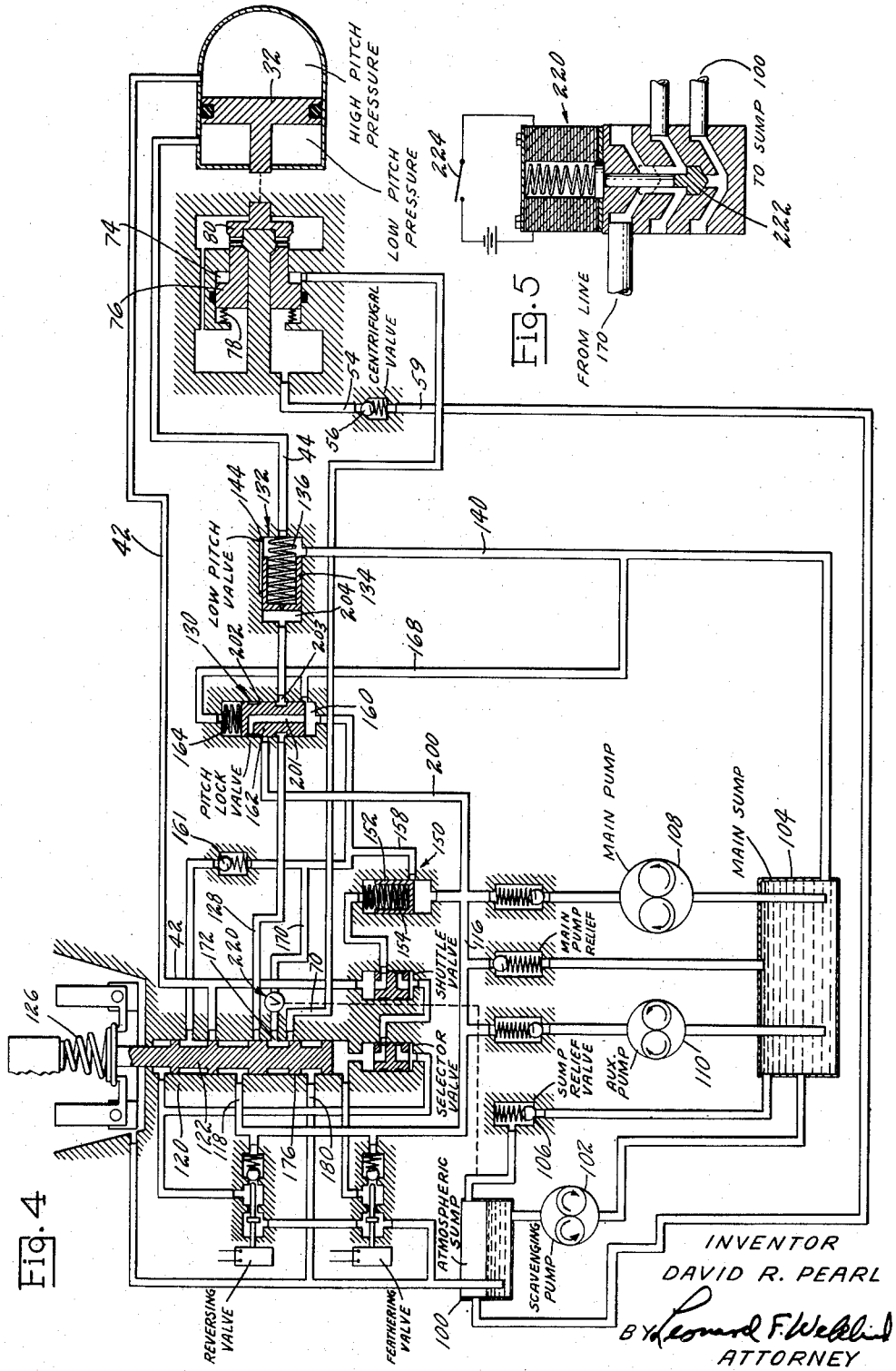

2,703,148

PROPELLER PITCH LOCK

David R. Pearl, West Hartford, Conn., assignor to United Aircraft Corporation, East Hartford, Conn., a corporation of Delaware Application March 6, 1952, Serial No. 275,051

3 Claims. (Cl. 170—160.32)

This invention relates to variable pitch propellers and more particularly to propellers having positive blade pitch locks.

It is an object of this invention to provide a variable pitch propeller having a positive pitch lock for preventing blade pitch variation under certain conditions.

It is a further object of this invention to provide a pitch lock for a variable pitch propeller wherein the pitch lock mechanism responds to the speed of rotation of the propeller to lock the blades against pitch changing movement.

It is another object of this invention to provide a pitch lock of the type described which responds to a pressure loss in the systems of a hydraulically actuated variable pitch propeller and is responsive to the relative position of the pitch control for the propeller blades.

These and other objects of this invention will become readily apparent from the following description of the drawings in which:

Fig. 1 is a longitudinal section through a propeller and its pitch changing mechanism mounted on a drive shaft.

Fig. 2 is a detail cross-sectional view taken along the line 2—2 of Fig. 1.

Fig. 3 is a cross-sectional view taken along line 3—3 of Fig. 1.

Fig. 4 is a schematic diagram of the propeller pitch changing system including means for actuating a pitch lock; and Fig. 5 is a cross-sectional and schematic view of a manually operated system for engaging the pitch lock.

The propeller shown in Fig. 1 comprises a hub 10 secured on shaft 12 (which may be a part of the engine crankshaft or a separate propeller shaft) and retained in position thereon by the usual cones 14 and retaining nut 16. The cones 14 are of the split type to permit installation. Hub 10 carries a plurality of blades 18, three in the modification shown, mounted for pitch changing movement on bearings 20 in hub socket 22. Each blade 18 is provided with a gear segment 24 which meshes with common gear 26 for simultaneously turning all the blades to vary their pitch. Gear 26 is actuated by and may be integral with a cam 28 which is turned by the action of cam followers 30 movable by a piston 32 and cooperating with both cam 28 and a fixed cam 34. For a more detailed description of the cam and cam followers reference may be made to Caldwell et al. Patent No. 2,174,717 or Martin et al. Patent No. 2,280,713.

Piston 32 is slidable, by a preponderance of oil under pressure on one side or the other, in a cylinder formed by dome 36. Piston 32 is in the form of an annulus and, in the center, slides over a sleeve 38 the purpose of which is described in copending patent application Serial No. 193,481, filed November 1, 1950. Piston 32 is shown as sealed at the cylinder and at the sleeve by O-ring seals 31 and piston ring 33 respectively. The ring 33 is carried by sleeve 38 and engages sleeve 35 which is fixed to and axially movable with the piston 32. From the above description it is apparent that a preponderance of oil pressure on either side of piston 32 will move the piston and cause a change in the pitch of the propeller blades.

Oil is conducted from a governor described hereinafter and which is driven in timed relation to said propeller, and piston 32 through two lines 42 and 44. The governor acts to selectively increase the pressure in one line and reduce the pressure in the other in order to move the piston 32 and control the propeller pitch to maintain constant speed.

In order to move the piston in an inboard direction, i. e., to the right in Fig. 1, fluid under pressure is introduced via line 42, channels 46, 47 and passage 49 to the nose end of the dome from whence it finds its way to the front or outboard side of piston 32. The oil under pressure flows from line 42 and channel 46 through the shaft splines 51, the split in cone 14 and finally finds its way to channel 47 and passage 49.

Oil under pressure in line 44 finds its way internally of the hub to the aft or inboard side of the piston 32 tending to force the piston forward or outboard. When the governor introduces fluid through line 42 and channel 46 the front side of piston 32 is connected via line 44 to drain or sump.

The chamber 48 has a passage 54 which communicates with the top side of a centrifugally operated check valve 56 (also seen in Fig. 2). The underside of valve 56 as viewed in Figs. 1 and 2 communicates with a drilled passage 58 which connects with line 59 leading to the atmospheric sump as indicated in Fig. 1 and as fully described in connection with Fig. 4.

As seen in Fig. 1, a pitch lock oil line 70 is provided which communicates with a passage 72 in the propeller hub 10. The passage 72 communicates with a chamber 74 in the hub 10. When pressure is supplied to the chamber 74 an annular ring or lock element 76 is forced inboard or to the right, as viewed in Fig. 1, against the force of a plurality of springs 78. The lock element 76 is splined to the hub so that although it is permitted to move along the axis of propeller rotation it is fixed for rotation with the propeller and hub 10. A second lock element 80 is fixed to the blade interconnecting gear 26 and also to the rotating cam portion 28 of the pitch changing mechanism. The pitch lock elements 76 and 80 are more clearly seen in Fig. 3. The adjacent faces of the pitch lock elements 76 and 80 have engageable teeth 84 which as shown are constructed to permit relative movement in one direction but to prevent relative movement in another direction when the teeth are engaged. Thus, when the teeth 84 are engaged it is desirable to prevent blade pitch change in a low pitch direction only.

Each of the pitch lock elements 76 and 80 include cooperating cam elements 86 and 88, respectively, as shown in Figs. 1 and 3. These cooperating cam elements positively disengage the pitch lock elements 76 and 80 in certain pitch range positions of the blades, as for example in the feathering and reversing ranges.

Thus, from the foregoing it is seen that by providing oil under pressure to the chamber 74 the pitch lock elements 76 and 80 will be disengaged and that in certain ranges even in the absence of the pitch lock oil in chamber 74 the pitch lock will be positively disengaged.

A pitch changing system and the pitch lock control is schematically illustrated in Fig. 4 where like numerals are utilized to indicate like parts shown in the previous figures.

As shown herein, a sump 100 is under atmospheric pressure and contains fluid which is withdrawn therefrom by a scavenging pump 102 which in turn supplies the main sump 104 with fluid under pressure. The main sump is maintained at some pressure higher than atmospheric by means of a relief valve 106. The propeller control system is supplied with fluid under pressure from the main sump by means of a main pump 108 and an auxiliary pump 110. The usual relief valve and check valves are illustrated. The main pump 108 supplies fluid under pressure to a manifold 116 which in turn connects to various portions of the hydraulic system. Primarily, the manifold 116 leads to a line 118 in the body of the valve 120. The movable portion 122 of the valve 120 includes a plurality of lands which control the flow of fluid to the propeler pitch changing mechanism and to the pitch lock. Thus, for example, when the governor 126 moves the valve portion 122 upwardly, high pressure fluid is supplied to the line 42 to the high pitch side of the piston 32. Likewise, when the governor 126 moves the valve portion 122 downward, high pressure fluid is supplied to the line 128 through the pitch lock valve 130 and then to the low pitch valve 132. The low pitch valve 132 includes a movable piston 134 which is biased to the left by a spring 136 so that normally, as illustrated, the line 44 is connected to the line 140 which leads to the main sump 104. When the valve portion 122 is supplying fluid under pressure to the line 128 and through the valve 130, the piston 134 is moved to the right so as to permit the flow of fluid through the passage 144 and then into the line 44 and to the low pitch side of the piston 32. When the piston 134 of the low pitch valve 132 is moved to the right it blocks off the line 140 leading to the main sump.

The pitch lock valve 130 insures that there is adequate pressure in the pitch lock actuating system to hold the pitch lock unlocked before fluid is permitted to flow to the low pitch side of the pitch changing piston 32. The low pressure relief valve 150 is provided in the system so that the main pump supplies a pressure only high enouhg to hold the desired blade pitch and hence at less than main pump relief pressure. The valve 150 is not fundamental to the pitch lock but since in normal operation the excess or waste flow of the main pump is flowing through the valve, such flow is utilized as a source of supply for the pressure required to hold the pitch lock in an unlocked position.

Actually then the pitch lock valve 130 acts as a relief valve for the exhaust flow from valve 150 and by virtue of spring 164 the pressure in 160 is at a predetermined pressure which is higher than main sump pressure. This fluid under pressure in 160 also flows through passages 170, 172, 70 and to 74 to hold the pitch lock normally unlocked.

The oil under pressure in chamber 160 has three possible sources. These include the by-pass oil from low pressure relief valve 150, the oil coming from the high pitch line check valve 161, and oil directly from the main pump 108 through line 200 and passage 201. The length of the pitch lock valve piston 162 from its bottom surface up to the lower edge of the annulus 202 is of controlling importance since the normal supply of oil to chamber 160 comes through passage 200 and is metered to annulus 202 and passage 201 in such quantity as is necessary to maintain the required pressure in chamber 160. The pressure in 160 (excepting in some extreme conditions such as unfeathering at 50,000 ft. altitude) is maintained at a constant value above main sump pressure. The elevated pressure above sump pressure is maintained as follows. Main sump pressure is applied to the top end of pitch lock valve piston 162 and the force of the spring 164 is added to the force exerted by the main sump pressure. These forces must then be balanced by a pressure higher than main sump pressure (in chamber 60) so as to maintain a valve piston position such that line 128 will be in communication with line 203.

The same applies for an unfeathering operation after the blades are back out of the operative range of the "kick-out" cam 86.

For normal operation in the governing range of blade angles valve element 162 of valve 130 is in the position shown in Fig. 4 so that the blades can be moved to low pitch by pressure moving to line 44. The normal governing of the system moves the blades to low pitch by reducing pressure in line 42 somewhat and allowing centrifugal twisting moment to carry the blades toward low pitch.

To feather the propeller the feathering solenoid valve hydraulically moves governor valve element 122 up. This causes the pitch lock to become engaged but here again the ratchet teeth permit pitch change toward high pitch until the pitch lock "kick-out" cam range is reached.

Under normal operating conditions the line 140 is connected to the main or pressurised sump 104 and hence likewise line 168. Chamber 160 is also connected to the main sump by reason of the piston 162 uncovering a small portion of the lowermost port leading to line 168. Under such conditions then the line 170 is also under main sump pressure and provides fluid under this pressure to the port 172 of the control valve 122. Thus, as illustrated, the movable valve portion 122 includes an additional land 176 which normally supplies fluid from the port 172 to the line 70 leading to the chamber 74 of the pitch lock. In the valve position illustrated, pressure from chamber 160 of pitch lock valve 130 is supplied (via lines 170, 70) to the chamber 74 of the pitch lock so that the movable element 76 of the pitch lock is held disengaged from the element 80 of the pitch lock.

During a predetermined overspeed condition, i. e., when the land 176 of the valve 122 moves upwardly a predetermined amount, the pitch lock line 70 will be disconnected from 172 and will be connected to the line 180 which leads to the atmospheric sump. Thus under these conditions the chamber 74 of the pitch lock will be connected to the atmosphere so that the springs 78 of the pitch lock will move the element 76 into engagement with the lock element 80 to prevent pitch changing movement to lower pitch.

The ratchet type teeth are provided on the pitch lock elements so that the normal hydraulic system may function to move the blades toward high pitch and thus correct an overspeed condition, or to feather the propeller if the operator desires, even though the pitch lock is in the locked position whether manually or automatically.

In the event that it is desirable to include a manual as well as automatic control for the pitch lock, a valve such as illustrated in Fig. 5 may be connected in the pitch lock line 170, as illustrated in Fig. 4. In the normal position of the manual pitch lock valve 220 it merely supplies the path from line 170 to port 172 of the governor valve so that the pitch lock may function automatically in response to speed or low pressure. With the manual pitch energized by means of switch 224 the element 202 moves to the dotted position so that the valve disconnects 170 from 172 and connects 100 to 172 so that the chamber 74 of the pitch lock is drained to the atmosphere sump. This causes the lock to engage regardless of the position of the element 122 of the governor valve. Thus the manual pitch lock can never prevent automatic pitch locking but it can override the automatic system to lock pitch when the operator so desires.

Referring again to Fig. 4, the function of the centrifugal valve 56 is best described herein. Inasmuch as the pitch changing mechanism and the pitch lock are located in the propeller hub it is desirable to keep these units filled with oil. Therefore, when the propeller stops rotating the valve 56 will close off the line 54 to prevent draining all the oil from the hub back to the atmospheric sump. When the speed of the propeller is sufficient and fluid is being supplied from the main pump, the centrifugal valve then opens to permit any drainage that may be necessary.

The remaining elements illustrated in Fig. 4 do not form a specific part of this invention and hence the description thereof is omitted herein for convenience.

As a result of this invention it is readily apparent that a simple yet efficient pitch lock mechanism is provided which responds to a predetermined position of the control valve 122 relative to the valve body 120. In other words, the pitch lock control is a speed responsive device.

Although only one embodiment of this invention has been illustrated and described herein, it will be apparent that various changes and modifications may be made in the construction and arrangement of the various parts without departing from the scope of this novel concept.

What it is desired to obtain by Letters Patent is:

1. In a lock for the pitch changing mechanism of a controllable pitch propeller having a hub, said propeller having variable pitch blades and control mechanism therefor, said control mechanism being movable in two directions, lock means interconnecting the pitch changing mechanism and the hub including a single acting servo for engaging and disengaging said lock means, means fixed relative to said control mechanism, means responsive to predetermined positions between said control mechanism and said fixed means operatively connected to said servo for controlling the engagement and disengagement of said lock means, and manual means operatively connected to said servo for overriding said last mentioned position responsive means and controlling said servo motor irrespective of the relative positions of said control mechanism and said fixed means.

2. In a propeller having a hub, a blade mounted for pitch changing movement relative to said hub, means for varying the pitch of said blade, a source of fluid under pressure, speed responsive means for controlling said pitch varying means including operative connections to said pitch varying means and said source, blade lock means interconnecting the pitch changing mechanism and hub, means holding said lock in an unlock position including a piston engageable with said blades, a spring engaging one side of said piston and urging said piston into blade lock position, the spring side of said piston being vented to atmosphere, means for admitting fluid under pressure to the other side of said piston to maintain the latter in an unlock position, means fixed relative to said control means, means responsive to a predetermined relationship between said control means and said fixed means including a movable valve having a land for connecting said other side of said piston to atmosphere upon a predetermined movement thereof in one direction, and manual means operatively connected to said piston for overriding said relationship responsive means and connecting the other side of said piston to atmosphere for engaging said lock irrespective of the relationship of said control means and said fixed means.

3. In a propeller having a hub, a plurality of blades mounted for pitch changing movement in said hub, means for varying the pitch of said blades including a source of fluid under pressure, means for controlling said pitch varying means including a valve movable in pitch increasing and decreasing directions and operatively connected between said source and said pitch varying means, a pitch lock comprising engageable lock elements operatively connected to said hub and blades respectively for locking said blades against movement, said lock including cooperating cam members engageable in predetermined blade pitch ranges for positively unlocking said lock elements, a piston connected to one of said elements for engaging said one element with the other element, a compression spring engaging one side of said piston and urging said piston toward a pitch lock position, a land forming a portion of said valve for directing fluid under pressure to the other side of said piston to disengage said elements, means cooperating with said land for connecting said other side of said piston to drain irrespective of the position of said blades, said land connecting said other side of said piston to drain in response to a predetermined movement of said valve in a pitch increasing direction, and a port fixed relative to said land for establishing the amount of said predetermined movement including operative connections to the other side of said piston.

References Cited in the file of this patent

UNITED STATES PATENTS

| | | |
|---|---|---|
| 2,174,717 | Caldwell et al. | Oct. 3, 1939 |
| 2,280,713 | Martin et al. | Apr. 21, 1942 |
| 2,282,297 | Keller | May 5, 1942 |
| 2,320,195 | Rindfleisch | May 25, 1943 |
| 2,343,416 | Keller | Mar. 7, 1944 |
| 2,392,364 | Caldwell et al. | Jan. 8, 1946 |
| 2,477,868 | Forman | Aug. 2, 1949 |
| 2,592,124 | Diefenderfer | Apr. 8, 1952 |
| 2,635,702 | Anderson | Apr. 21, 1953 |
| 2,653,671 | Martin et al. | Sept. 29, 1953 |